Figure 2:
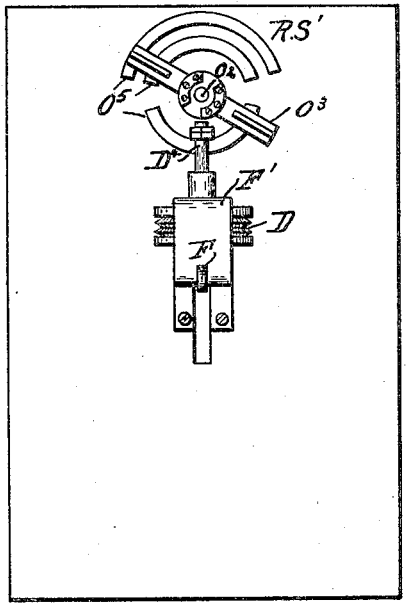
Figure 5:
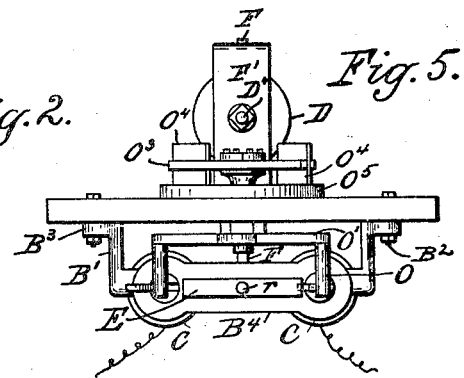
Figure 4:
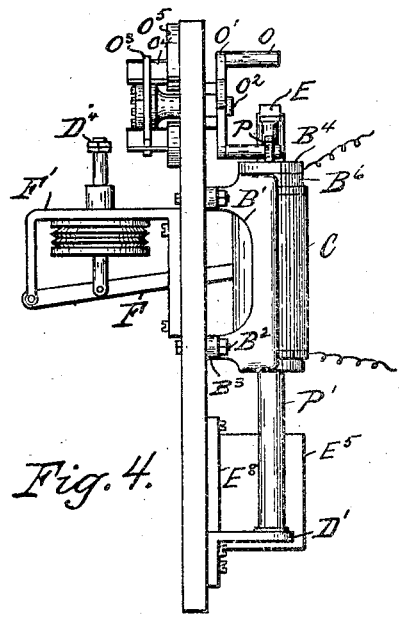
Figure 3:
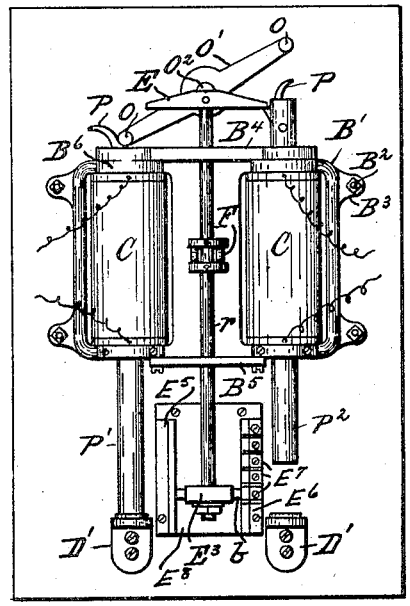

A. LE BLANC.
REMOTE ELECTRIC CONTROL SYSTEM FOR SEARCH LIGHTS AND THE LIKE.
APPLICATION FILED FEB. 5, 1909.
939,719.
Patented Nov. 9, 1909.
3 SHEETS—SHEET 1.
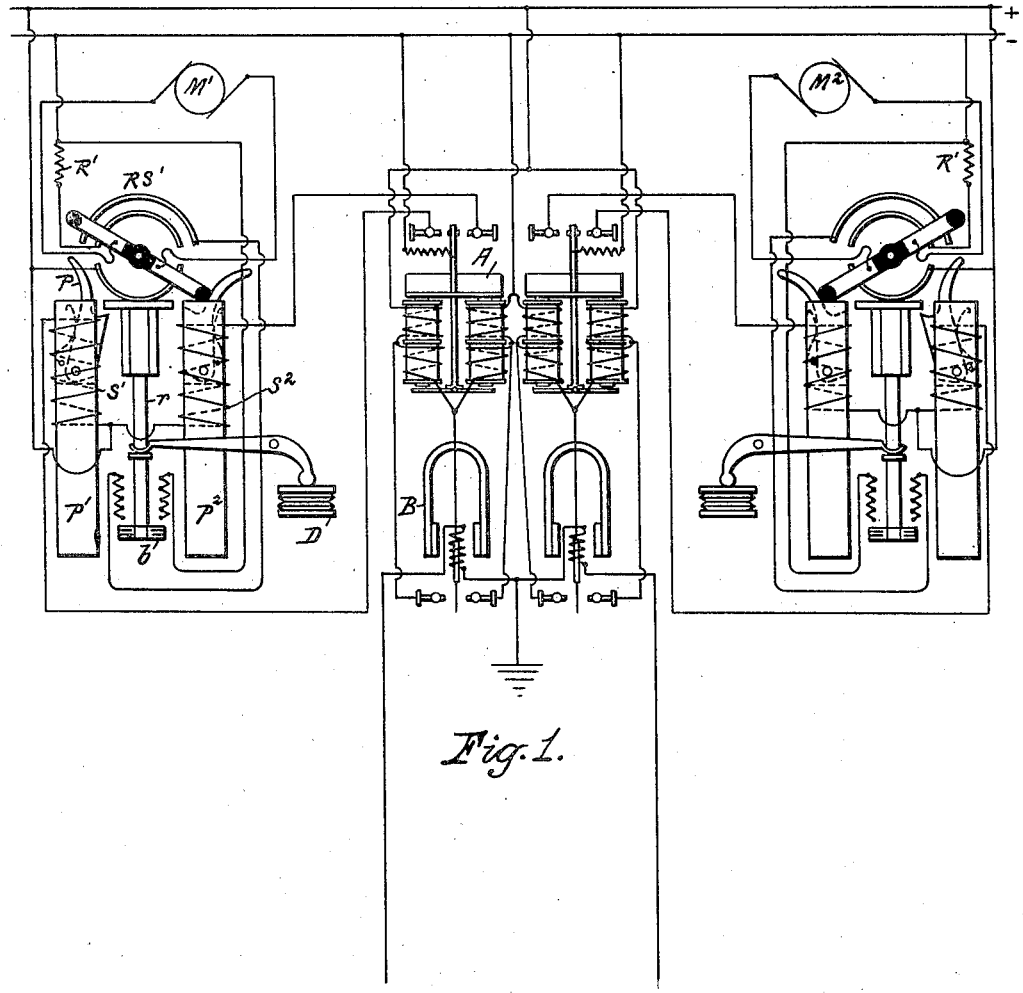
Fig. 1.
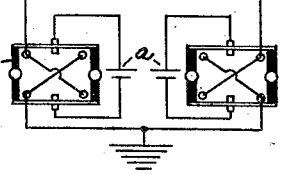
WITNESSES:
Chas. P. Day.
Clifford A. Alliston.
INVENTOR
Alexis Le Blanc
BY
Fischer & Sanders
ATTORNEYS.

A. LE BLANC.
REMOTE ELECTRIC CONTROL SYSTEM FOR SEARCH LIGHTS AND THE LIKE.
APPLICATION FILED FEB. 5, 1909.

939,719.

Patented Nov. 9, 1909.

3 SHEETS—SHEET 3.

WITNESSES:
Chas. P. Day.
Clifford A. Alliston

INVENTOR
Alexis Le Blanc
BY
Fischer & Sanders.
ATTORNEYS.

UNITED STATES PATENT OFFICE.

ALEXIS LE BLANC, OF NEW YORK, N. Y.

REMOTE ELECTRIC-CONTROL SYSTEM FOR SEARCH-LIGHTS AND THE LIKE.

939,719. Specification of Letters Patent. Patented Nov. 9, 1909.

Application filed February 5, 1909. Serial No. 476,212.

*To all whom it may concern:*

Be it known that I, ALEXIS LE BLANC, a citizen of the United States, residing at New York, in the county of New York and State of New York, have invented certain new and useful Improvements in Remote Electric-Control Systems for Search-Lights and the Like, of which the following, taken in connection with the accompanying drawings, is a full, clear, and exact description, such as will enable others skilled in the art to which my invention relates to make, construct, and use the same.

This invention relates to naval, military, and the like, searchlight projectors, with electric motor control, in which by the manipulation of simple means, the current is caused to operate two electric motors of a searchlight, and when said means are released, the searchlights are instantly brought to rest without shock and held in position. One of the motors usually operates a train of gears controlling the vertical movement, and the other is connected with a train of gears controlling the horizontal beam of light.

The invention has for its object, the production of an improved system for electrically controlling searchlights for use in the field, in land fortresses, for naval stations or coast defenses, or for battleships, and consists of simplified means for starting, stopping, reversing, regulating and controlling the direction and speed of said motors from a distance, by the use of sensitive means designed to overcome the effects of sparking and by the use of simple and sensitive accessories and controlling means operated from the controlling end by an auxiliary current.

Heretofore, it has been customary to connect the controlling end of the system with the light or power end, regardless of the distance between the same, by means of heavy electric cables of sufficient weight and capacity to carry the necessary current for the motors, which were coiled upon reels and usually mounted upon transport wagons ready for use when desired. The controllers heretofore used, in many cases, were of such weight and dimension, that it was also necessary to mount the same upon wagons in order to haul them to the place of operation.

With my improved system, the heavy electric cables heretofore used for carrying the necessary current for the motors, are entirely dispensed with, and a wire of sufficient capacity to carry an auxiliary current of not more than a hundredth of an ampere, is substituted therefor. I also dispense with the large and heavy controllers heretofore used, and substitute therefor, a controlling device of such size and dimensions, as will admirably adapt itself to be mounted upon an ordinary field or marine glass or other portable support, and one which can easily be carried in the pocket of the operator.

Figure 6:
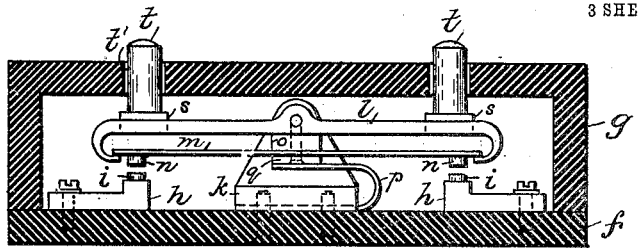
Figure 7:
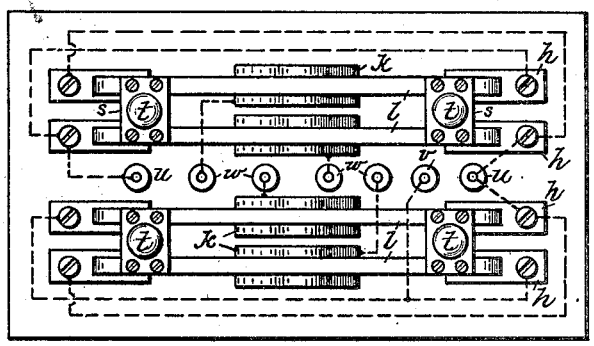
Figure 8:
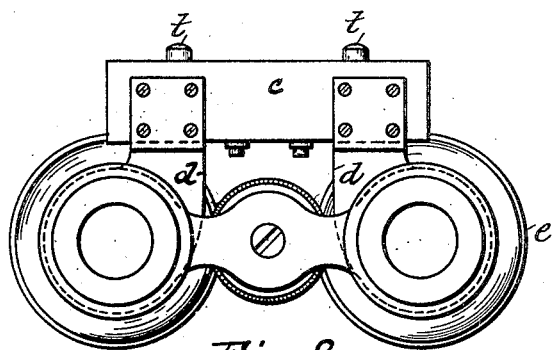
Figure 9:
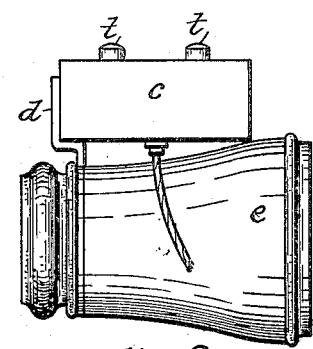

In the accompanying drawings, which clearly illustrate my invention, Figure 1 represents a diagrammatic view of my improved system. Figs. 2, 3, 4 and 5 represent respectively, front, rear, side and top elevations of the switchboard carrying the reversing switch and the solenoids. Fig. 6 represents a sectional view of the controller. Fig. 7 represents a plan view of the controller with the top removed, and Figs. 8 and 9 represent front and side views of one form of mounting the controller upon a portable support such as a field glass.

Similar letters of reference refer to like parts throughout the specification and drawings.

In carrying out my invention, I employ suitable motors $M'$ and $M^2$, preferably located in close proximity to the searchlight, in order to obtain horizontal and vertical movement of said light. Inasmuch as the various accessories used in connection with one motor are the same as those to be used in connection with the other motor, the description of one applies to the other. $R'$ designates a resistance in series with the motor of such value that the motor will not start when the line circuit is closed through this resistance alone, but will allow the motor to continue to revolve by its own momentum and by means of the small current passing through the resistance $R'$.

Suitably mounted on the front of a switchboard conveniently located near the searchlight, is a reversing switch $RS'$, to be hereinafter described, the function of which is to reverse the direction of the current passing through the armature of the motor $M'$, thereby reversing the direction of the same. On the back of the switchboard directly behind the reversing switch $RS'$, are located the solenoids $S'$ and $S^2$, provided with iron plungers $P'$ and $P^2$, which are drawn into the solenoids $S'$ and $S^2$ when said solenoids are energized. Each plunger is provided with a trip pawl P.

The first upward movement of one of the plungers sets the arms of the reversing switch in the proper position to send a current through the motor M' in the desired direction. If the plunger P' drops back into its former position, the switch arm remains in its assumed position and the pawl P moves outward. A second upward movement of the same plunger by reason of its engagement with the pawl, carries a sliding rod $r$ with it, which has attached to it, a connecting brush $b$, which closes a by-pass to the resistance R', thereby diminishing the total resistance in the working circuit step by step, causing the motor M' to start and to gradually increase its speed. If the plunger drops back a second time, the by-pass is opened immediately which is caused by the return movement of the rod $r$ and the motor for a short period of time continues to revolve of its own momentum. In order to provide dampening means for the motion of the rod $r$, the same is in engagement with a dash pot D. Inasmuch as the said rod $r$ is not positively connected with the dash pot, the return movement of the rod to its original position is therefore instantaneous.

A represents an electro-magnetic relay also conveniently located on the switchboard, the action of which is to energize one of the solenoids. This electro-magnetic relay A is operated by the action of the moving coil relay B. The electro-magnetic relay A has its winding in four sections arranged differentially, and is permanently connected to the line circuit. The action of the moving coil relay B causes one section of the winding of the electro-magnetic relay A to become short circuited, and the electro-magnetic relay A energized. The moving coil relay B is operated by an auxiliary circuit consisting of a single dry cell battery $a$, (two such batteries being used in the entire system) which in this particular instance is connected to a controller $c$, the controller $c$ being connected to the moving coil relay B from where the current returns through earth to the controller.

The switchboard illustrated in Figs. 2, 3, 4 and 5, heretofore referred to, is preferably located near the searchlight, and has mounted on its rear side, the solenoid magnets C, suitably mounted in the cast-iron frames B', said frames being secured to the switchboard by bolts $B^2$ passing through lugs $B^3$ of the frames B'. The cast-iron frames B' are spaced apart, and fastened together by two brass or other non-magnetic bars $B^4$ and $B^5$. The upper bar $B^4$ extends entirely across the face of the solenoids C, and is provided with apertures or openings for the passage of the upper ends of the plungers P' and $P^2$. Each of the solenoids C is provided with a brass bushing which passes through and extends a short distance beyond their ends, the said brass bushings being secured under the box caps $B^6$, thereby retaining the solenoids in position in the frames B'.

The solenoid cores or plungers P' and $P^2$ are made up of two sections, the upper consisting of brass and the lower of soft iron. The upper section of the plunger is provided with a slot in which is pivotally secured a spring actuated trip pawl P. The upper ends of said spring actuated trip pawls are so arranged in the slotted end of the plunger as to strike and have sliding engagement with the crank pins O, which are secured to and extend from the rock lever O', which is rigidly secured to a shaft $O^2$ which passes through the switchboard and which has secured at its forward end, the arms $O^3$ of the reversing switch RS'. The arms of the reversing switch are provided with contact brushes $O^4$ which contact with the split copper rings $O^5$ secured to the front of the switchboard, in order to control the motor. The trip pawls P are so positioned, that the tail pieces thereof will contact with the crank pins O, when the latter are in the downward position, thus keeping the trip pawls out of the path of the cross bar E, until the second upward movement of the plungers. The cross-bar E is fixed to the upper end of the rod $r$, and may be operated upon by either of the plunger trip pawls. The rod $r$ has secured to its lower end, the brush holder $E^3$, and contact brush $b$, which has sliding contact with the plates $E^5$ and $E^6$, the latter being made up of sections E and separated by mica or other insulating material. Both contact plates $E^5$ and $E^6$ are suitably mounted upon a block of hard rubber $E^8$, parallel to each other and to the rod $r$. The object of these contacts is to throw in varying resistances to regulate the speed of the motor.

That the rod $r$ and brush $b$ may not move up too fast, an air check is provided. The rod $r$ is provided with collars, between which the forked end of the lever F passes and which is pivoted in the bracket F' secured to the front of the switchboard. Secured to the bracket is the air check bellows or dash pot D, the plunger of which is pivoted to the forked lever F, and an air check is so arranged that the compression may be varied by a suitable valve on the upstroke of the rod $r$, but allows the rod to return instantly on its downward stroke. To cushion the blow, and to support the plungers, suitable felt-covered or cushioned brackets D' are provided.

The controller $c$ illustrated in Figs. 6, 7, 8 and 9, consists of a number of circuit closing contact points secured to suitable springs and brackets inclosed in a hard rubber box of such small dimensions as to enable it to be readily mounted upon any portable support such as a field glass $e$ as illustrated in Figs. 8 and 9, which is provided with a pair of brackets $d$ having offset portions to which the controller is secured by any suitable means. The box is preferably made of hard rubber and consists of the base $f$ and the cover $g$. Secured to the base are the different brackets $h$ carrying the contact points $i$ which are electrically connected as is common in cross-over switches, as well as the slotted brackets $k$ to which are pivotally secured the rock levers $l$. The ends of the levers are bent downward and inward to form convenient supports for the ends of the contact springs $m$. These springs are also provided with contact points $n$ designed to contact with the contact points $i$ on the brackets $h$ which are secured to the hard rubber base $f$, and are secured to the rock levers in any convenient manner, and in order that said springs may have upward play, they are spaced away from said rock lever by means of a small block $o$.

Conveniently secured to the under side of each one of the slotted brackets $k$, is a compression spring $p$, so arranged that its free end will act upon a block $q$ secured to the under side of the contact springs $m$, so as to normally maintain the rock levers $l$ carrying said contact springs $m$ in a central position and keep the contact points $n$ of the springs $m$ from contacting with the contact points $i$ on the bracket $h$. As will readily be seen from the drawings, the rock levers $l$ are connected together in pairs by means of the hard rubber push button blocks $s$ which are provided at their bottoms with depending ribs to separate the levers and on their tops with push buttons $t$ designed to pass through suitable apertures $t'$ in the top of the controller case $g$. Conveniently arranged upon said hard rubber base, are seven binding posts, two of them lettered $u$ are to be connected to the two line wires leading to the control mechanism on the reversing switchboard placed at a distance. One of the binding posts $v$ is connected to the wire and grounded and four of the other binding posts $w$ are connected to the battery which operates the controller.

The operation of the device is as follows: In case the motor $M'$ should be given revolution in the direction opposite to that for which the switch arm of the reversing switch $RS'$ is set, the arm must be in the opposite direction from that shown in the drawing, in which case, the solenoid $S^2$ must first be energized, and for this purpose, the electromagnetic relay $A$ must be so energized that its contact arm will move to the right. This takes place when the contact arm of the moving coil relay $B$ has moved to the right, causing the current to pass through the contact arm attached to the moving coil relay $B$, and this is accomplished by the operation of the controller $c$, which is connected to the moving coil relay $B$. When the solenoid $S^2$ is so energized, the plunger $P^2$ is drawn into the solenoid, causing the switch arm of the reversing switch $RS'$ to assume its proper position. The opening of the controller $c$ causes the plunger $P^2$ to drop back and imparts a forward motion to the trip pawl $P$, but has no influence upon the switch arm which remains in its newly assumed position. If the controller $c$ is then again closed in the same direction, the solenoid $S^2$ will be again energized, and the plunger $P^2$ will be drawn in, but in this instance, the plunger does not move the switch arm but takes with it, by reason of its engagement with the pawl, the sliding rod $r$. The motion of the plunger and sliding rod is dampened by the dash pot $D$ and depends therefore upon the length of contact imparted to the controller $c$. The longer this contact is held, the farther will the plunger and rod move in an upward direction, carrying with it the contact brush $b$ which closes the by-pass to the resistance $R'$, thereby reducing the total resistance step by step, and starting the motor and increasing its speed accordingly. After the controller $c$ is opened again, the sliding rod $r$ together with the contact brush $b$ will return instantly to its first position, owing to the manner in which said rod $r$ is connected to the dash pot $D$. The by-pass to the resistance $R'$ is therefore opened, but the motor will continue to revolve by its own momentum and by reason of the small current passing through the resistance $R'$. Should it be desired to stop the motor, it will only be necessary to close the auxiliary circuit through the reversing or controlling switch $c$ in such a manner that the solenoid $S'$ becomes energized, which will cause the arm of the reversing switch $RS'$ to be turned back in its original position, thereby reversing the current through the motor and stopping the same, for the reason that the resistance $R'$ is too high to give to the motor sufficient torque to start it up in the opposite direction.

With my improved system, the heavy cables and controllers heretofore used, are dispensed with, and a wire of sufficient capacity to carry an auxiliary current of not more than one hundredth of an ampere, and a controller of such size as will admirably adapt itself to be mounted upon an ordinary field or marine glass is substituted, and I am therefore enabled to vary the speed and direction of the motor or motors used in the system from an unlimited distance, as distinguished from the systems now in use in which the operative distance of control is limited to less than three miles.

Although I have described the best form of my invention known to me, I do not desire to be limited to the particular construction and organization of parts illustrated, except to the extent indicated in the appended claims, since in its broader aspect, the invention may take various forms.

I claim:

1. In a system of remote control, a motor, a reversing switch for said motor including means for governing the direction of rotation and speed of said motor, a local circuit for energizing said means, an electro-magnetic relay connected to said circuit for automatically controlling said circuit, a moving coil relay for controlling said electro-magnetic relay, an auxiliary circuit for operating said relay and a controller for operating said relays, whereby the reversing switch and their means are actuated to vary the speed and direction of said motor.

2. In a system of remote control, a motor or group of motors, reversing switches for each of said motors or groups of motors, including means for governing the direction of rotation and speed of each motor or groups of motors, local circuits for energizing said means, an electro-magnetic relay connected to said circuits for automatically controlling said circuits, a moving coil relay for controlling said electro-magnetic relay an auxiliary circuit for operating said relay, a controller, a portable support to which said controller is secured for operating said relays whereby the reversing switches and their means are actuated to vary the speed and direction of said motor or groups of motors.

3. In a system of remote control, a motor or group of motors, reversing switches for each of said motors or groups of motors, including means for governing the direction of rotation and speed of each motor or groups of motors, local circuits for energizing said means, an electro-magnetic relay connected to said circuits for automatically controlling said circuits, a moving coil relay for controlling said electro-magnetic relay an auxiliary circuit for operating said relay and a controller for operating said relays, whereby the reversing switches and their means are actuated to vary the speed and direction of said motor or groups of motors.

4. In a system of remote control, a motor, an electro-magnetically actuated switch for operating said motor, a local circuit for the actuating coil of said switch and motor, relays for controlling said local circuit, a controller and an independent source of current for operating one of said relays, whereby the switch is actuated to vary the speed and direction of said motor.

5. In a system of remote control, a motor, electrically controlled mechanism for operating said motor, a local circuit for energizing said means and motor, relays, an auxiliary circuit for operating said relays, a controller, a portable support upon which said controller is mounted and adapted to control said auxiliary circuit to vary the speed and direction of said motor.

6. In a system of remote control, a motor or group of motors, electrically controlled mechanism for operating said motors, a permanently connected controller, a portable support upon which said controller is mounted and an auxiliary circuit connected with said controller to vary the speed and direction of said motor or group of motors.

7. In a system of remote control, a motor, electrically controlled mechanism for operating said motor, a permanently connected controller, a portable support upon which said controller is mounted and an auxiliary circuit connected with said controller to vary the speed and direction of said motor.

8. In a system of remote control, a motor, electrically controlled means for operating said motor, local circuits for energizing said means, a controller a portable support upon which said controller is mounted and an auxiliary circuit connected with said controller to vary the speed and direction of said motor.

9. In a system of remote motor control, a permanently connected controller, a portable support upon which said controller is mounted and an auxiliary circuit connected with said controller to vary the speed and direction of a motor or group of motors.

10. In a system of remote control, a motor, a reversing switch for said motor including means for governing the direction and speed of said motor, a local circuit for energizing said means and motor, relays for controlling said local circuit, an auxiliary circuit for operating said relays and a controller connected with said auxiliary circuit to vary the speed and direction of said motor.

11. In a system of remote control, a motor, a reversing switch for said motor including means for governing the direction and speed of said motor, a local circuit for energizing said means and motor, relays for controlling said local circuit operated by an auxiliary circuit and a controller, a portable support upon which said controller is mounted and connected with said auxiliary circuit to vary the speed and direction of said motor.

12. In a system of remote motor control, a moving coil relay, a controller a portable support upon which said controller is mounted, and an auxiliary circuit connecting said controller and relay to vary the speed and direction of a motor or group of motors.

This specification signed and witnessed this 25th day of January 1909.

ALEXIS LE BLANC.

Witnesses:
FREDK. C. FISCHER,
C. A. ALLISTON.